United States Patent [19]

Abe et al.

[11] Patent Number: 4,929,406
[45] Date of Patent: May 29, 1990

[54] PROCESS FOR PRODUCING AN INORGANIC POROUS MEMBRANE

[75] Inventors: Fumio Abe, Handa; Hiroshi Mori, Nagoya; Shigekazu Takagi, Aichi, all of Japan

[73] Assignee: NGK Insulators, Ltd., Japan

[21] Appl. No.: 357,268

[22] Filed: May 26, 1989

[30] Foreign Application Priority Data

May 27, 1988 [JP] Japan .................................. 63-130827
May 27, 1988 [JP] Japan .................................. 63-130828
May 31, 1988 [JP] Japan .................................. 63-133771

[51] Int. Cl.$^5$ ............................................. B01D 13/04
[52] U.S. Cl. .................................. 264/45.5; 264/48; 264/60
[58] Field of Search ................ 264/41, 45.1, 45.5, 264/48, 56, 60, DIG. 48, DIG. 62; 210/500.1, 500.21, 500.25, 500.26, 500.27, 510.1

[56] References Cited

FOREIGN PATENT DOCUMENTS

| 0188950 | 7/1986 | European Pat. Off. . |
| 2473313 | 7/1981 | France . |
| 2502508 | 10/1982 | France . |
| 2549736 | 2/1985 | France . |
| 2580517 | 10/1986 | France . |
| 52-94572 | 8/1977 | Japan . |
| 60-156510 | 8/1985 | Japan . |
| 61-500221 | 2/1986 | Japan . |
| 61-27091 | 6/1986 | Japan . |

OTHER PUBLICATIONS

B. E. Yoldas, "Hydrolysis of titanium alkoxide and effects of hydrolytic polycondensation parameters", Journal of Materials Science, vol. 21, 1986, pp. 1087–1092.

Primary Examiner—Frank Sever
Attorney, Agent, or Firm—Arnold, White & Durkee

[57] ABSTRACT

A multilayer inorganic porous membrane consisting of a monolayer or multilayer porous support having at least one surface integrally formed thereon with a porous thin layer having an average pore size less than that of the porous support, wherein a maximum pore size in the support surface is defined to be from 1 to 250 times an average pore size of the thin layer. The multilayer porous membrane is superior in preventing the occurrence of pin holes and cracks therein thereby to enhancing precision of the filtration and separation.

3 Claims, No Drawings

PROCESS FOR PRODUCING AN INORGANIC POROUS MEMBRANE

BACKGROUND OF THE INVENTION

1. Field of the Invention

The present invention relates to inorganic porous membranes adapted for use in filtration, gas separation or the like and a process for the production of the inorganic porous membranes.

2. Description of the Prior Art

As one of such inorganic porous membranes as described above, there has been proposed a multilayer inorganic porous membrane consisting of a monolayer or multilayer porous support integrally provided on at least one surface thereof with a porous thin layer having an average pore size smaller than that of the porous support. In general, this kind of inorganic porous membranes are required to be superior in corrosion resistance and heat resistance. In the case that high precision is required for filtration and separation, it is important to provide the inorganic porous membrane without causing any pin holes and cracks in its porous thin layer. In the case that the inorganic porous membrane is exposed to high temperatures, acid, alkali or the like in use for filtration and separation or in its regenerative process, it is required to be superior particularly in heat resistance. In a particular process for the production of superpure water in a semiconductor field or the production of pyrogen free water in a pharmaceutical field, however, a problem will be caused due to dissolution of components from the inorganic porous membrane.

In a regenerative process of the inorganic porous membrane for eliminating contaminants adhered thereto in a field of ultrafiltration or microfiltration, high resistance to corrosion is required for washing the porous membrane with acid and alkali. In a field where the inorganic porous membrane is used for ultrafiltration or microfiltration of fine particles such as organic colloid, the inorganic porous membrane, for instance, is washed with acid and alkali and with steam for sterilization. If pin holes, cracks or the like exsist in the thin layer of the porous membrane, they will increase during washing, resulting in deterioration of precision of the filtration and the resistant property to corrosion.

Such an inorganic porous membrane as described above is known from the following publications. In the Japanese Non-examined Patent Publication No. 60-156510 (U.S. Pat. No. 4,711,719) dislcoses a process for the production of an inorganic semi-permeable membrane by coating a porous support of sintered inorganic oxides with a suspension of coating material forming an inorganic thin layer and then heating the intermediate product. In this production process, the suitability of the porous support for forming the thin layer is determined mainly by an average pore size of the support. If the average pore size is too large, sol particles in the suspension permeate into the porous support and do not form any thin layer on the support. For this reason, it is pointed out in the publication that a preferable pore size of the support is about from 0.1 to 0.5 micron. For the purpose of preventing the forming of cracks during the production process, the intermediate product is dried by a complicated supercritical drying for a long time and is gradually heated during the firing process thereof so that a porous thin layer of $\gamma$-alumina is formed on the porous support to obtain an ultrafiltration membrane.

In the Japanese Non-examined Patent Publication No. 52-94572 there is disclosed a multilayer inorganic porous membrane consisting of a porous support coated with a porous thin layer, the porous support having an average pore size of from 10 to 200,000 times, preferably from 200 to 20,000 times that of the thin layer. A heat resistant inorganic porous membrane for gas separation is disclosed in the Japanese Examined Patent Publication No. 61-27091, and a filter in the form of a heat resistant inorganic porous membrane for liquid and gas filtration is disclosed in the Japanese Non-examined Patent Publication No. 61-500221. The former inorganic porous membrane consists of a porous support of heat resistant oxide having a pore size of from 1500 to 5000 angstrom integrally formed thereon with a sintered layer having an average pore size of from 200 to 1200 angstrom, the sintered layer containing aluminum oxide particles amounts of 97% by weight and having particle sizes of less than 0.5 micron. However, there is not disclosed any definition concerning the composition of the porous support and sintered layer. With regard to the composition of the support, it is noted that an example of the support contains mullite of 8% matrix and aluminum oxide with an impurity of 0.5% by weight. In the support, however, a big problem will be caused in corrosion resistance. With regard to the composition of the sintered layer, it is noted that an impurity in the layer is 3% by weight in maximum. However, the sintered layer as well as the support has a big problem in corrosion resistance and in dissolution of the impurity. With regard to the aluminum oxide forming the sintered layer, it is noted that $\alpha$-alumina of less than 0.5 micron is preferably used for the layer. In general, however, $\alpha$-alumina having a particle size of more than 0.2 micron has a specific surface area less than $10 m^2/g$, and $\gamma$-alumina having a particle size of less than 0.2 micron has a specific surface area more than $10 m^2/g$. Accordingly, $\gamma$-alumina having a particle size of less than 0.2 micron must be used to form a sintered layer having an average pore size of less than 0.1 micron. This will cause a problem in corrosion resistance of the sintered layer.

The latter inorganic porous membrane disclosed in the Japanese Non-examined Patent Publication No. 61-500221 is in the form of a tubular filter made of 99.9% alumina by weight and having an average pore size of from 2 to 20 micron, the filter being formed thereon with a filtration layer of titanium oxide having an average pore size of 0.2 micron. The publication does not disclose any porous membrane having an average pore size of less than 0.1 micron and superior in corrosion resistance.

Under the foregoing background, the problems to be solved by the present invention are summarized as follows. In general, pin holes and cracks in the thin layer of the multilayer inorganic porous membrane occur during the forming process of the thin layer. The porous thin layer is formed by coating a porous support by immersion in a sol liquid of fine particles, removal of the support from the sol liquid, drying in air, and firing. In such a process for forming the thin layer, the sol liquid permeates into pores of the support and is concentrated in the surface of the support. If the particles in the sol liquid is partly sucked into the support, pin holes will occur in the thin layer. In case the thin layer is partly thickened, cracks will occur by shrinking through drying and firing. The inventors have found the fact that the pin holes and cracks will occur if the particles in the sol liquid permeates easily into a portion of maximum pores in the porous support. It is, therefore, important to define the maximum pore size of the porous support in relation to the thin layer for preventing the forming of pin holes and cracks. In the prior art, however, the maximum pore size of the support has not been considered to prevent the forming of pin holes and cracks. The pin holes and cracks in the thin layer not only deteriorates precision of filtration but also causes the peeling off of the thin layer during washing with acid and alkali and steam sterilization.

To improve the corrosion resistance of the multilayer inorganic porous membrane, it has been considered to enhance the purity of materials. However, an impurity is inevitably contained in the material during the production process, while it is very difficult to control the sintering condition of a high purity material. In the sintering process of the high purity material, it is required to contain a sintering agent and a sintering restrainer into the material for obtaining a desired mechanical strength of the porous membrane. For these reasons, it has been found that a specific composition should be determined to obtain an inorganic porous membrane superior in corrosion resistance and capable of minimizing dissolution of components therefrom.

In a process of the production of an inorganic porous membrane having an average pore size of less than 0.1 micron, fine particles with a particle size of less than 0.2 micron or relatively large particles with a particle size of more than 0.2 micron are used as a material for the porous membrane. In a production process using the particles less than 0.2 micron, it is advantageous that spaces among the particles can be utilized to form pores in the membrane. It is, however, required to define a composition superior in corrosion resistance because of activity of the material itself. In a production process using the particles more than 0.2 micron, the material itself is relatively stable. In this process, however, spaces among the particles are shrinked by sintering to form pores in the membrane. It is, therefore, difficult to form a desired number of pores in the membrane. Moreover, such thermal shrinkage of the material will cause cracks in the membrane.

SUMMARY OF THE INVENTION

Accordingly, an object of the present invention is to provide a multilayer inorganic porous membrane and a process for the production of the membrane wherein a maximum pore size of a porous support is defined in a predetermined value to prevent the occurrence of pin holes and cracks thereby to enhance precision of the filtration and separation.

Another object of the present invention is to provide a multilayer inorganic porous membrane and a process for the production of the membrane wherein a specific composition of a porous thin layer is defined to enhance corrosion resistance of the membrane and to substantially eliminate dissolution of components from the membrane.

A further object of the present invention is to provide a multilayer inorganic porous membrane and a process for the production of the membrane wherein a specific composition of a porous support and an average pore size and thickness of a porous thin layer on the support are defined to prevent the occurrence of pin holes and cracks in the thin layer and to enhance corrosion resistance of the porous membrane.

The objects are accomplished by providing a multilayer inorganic porous membrane consisting of a mono- layer or multilayer porous support having at least one surface integrally formed thereon with a porous thin layer having an average pore size less than that of the porous support, wherein a maximum pore size in the support surface is defined to be from 1 to 250 times an average pore size of the thin layer. Preferably, the porous support is made of a heat resistant inorganic material to form thereon with a porous thin layer having an average pore size of less than 0.1 micron. It is desirable that the following components A to E are mixed with the porous membrane in an amount of less than 0.5% by weight in terms of oxide.

A: Alkali metal compound
B: Alkaline earth metal compound
C: Yttrium, lanthanide compound
D: VIII group compound
E: Compound having a specific surface area of more than $10m^2/g$ and a cation radius of less than 0.6 angstrom or more than 0.9 angstrom.

In the inorganic porous membrane, the thin layer may be made of titanium oxide of 99.5% purity. The porous membrane may be characterized in that the thin layer is formed to have an average pore size of less than 800 angstrom and a thickness of less than 2 micron and that an average pore size in the surface layer of the porous support formed thereon with the thin layer is formed is less than 0.1 micron.

In a process of the production of the inorganic porous membrane according to the present invention, the porous thin layer is formed by coating at least one surface of a porous support by immersion in a hydrosol including titanium hydroxide or titanium oxide. To prepare the hydrosol, a precursor forming the hydrosol is hydrolyzed under the presence of acid at a molar ratio of the precursor to water more than 1/200, and a molar ratio of titanium compound in the hydrosol to water is diluted less than 1/500. The prepared hydrosol is coated onto the porous support surface and fired at temperatures of from 300° to 700° C. after drying. In practical embodiments of the present invention, the porous support may be in the form of a pipe, a flat plate or a honeycomb structure consisting of a sintered body made of ceramic such as alumina, zirconia or titania, glass such as boro-silicate glass, metal such as nickel or carbon. The porous support may be formed in a monolayer or multilayer structure. In a multilayer porous support, the porous thin layer is formed on the support in such a manner that an average pore size of the support becomes smaller successively. In this case, the porous thin layer is made of the same material as that of the support, for example, hydrophilic alumina, titania or similar compound.

In the case that a porous thin layer having an average pore size of less than 0.1 micron is formed on the porous support, a heat resistant inorganic material such as oxides, carbide or nitride containing titanium, zirconium, hafnium, niobium, tantalum, aluminium and silicon with a specific surface area of less than $10m^2/g$ is used as a main component, and the following components A to E of less than 0.5% by weight at a total amount are mixed with the material..

A: Alkali metal compound such as lithium, sodium, cesium and the like
B: Alkaline earth metal compound such as beryllium, magnesium, calcium, strontium, barium or the like
C: Compound such as yttrium, lantanide, namely cerium, praseodymium, lanthanum or the like D: VIII group compound such as iron, cobalt, nickel or the like E: Compound such as aluminium of 3 valence, silicon of 4 valence, manganese of 4 valence or the like, which are having a specific surface area of more than $10m^2/g$ In addition, the precursor forming the hydrosol is selected from organic titanate compound of alkoxide, acilate, chelate and the like, titanium salt of titanium tetrachloride, titanyl sulfate and the like, and meta and ortho titanium hydroxide or titania.

The useful results of the present invention are summarized as follows: In a multilayer inorganic porous membrane wherein a maximum pore size of a porous support for the membrane is defined to be from 1 to 250 times an average pore size of a porous thin layer, it has been found that any pin holes and cracks does not occur in the thin layer. The average pore size of the thin layer was determined in accordance with use of the membrane and could be adjusted by a particle size of the raw material and in a process of the production of the porous membrane. The porous support includes two types of structure, that is, a monolayer porous support having an average pore size of Dav and a multilayer porous support consisting of a basic support having an average pore size of Dav and an additional support attached onto the one side surface of the basic support and having an average pore size of Dav' which is smaller than Dav. In the multilayer support, it is desirable that each layer of the support has the same composition and the same or nearly same coefficient of thermal expansion. The average pore sizes of the porous support Dav and Dav' each are determined to be larger than that of the thin layer dav, the preferable values of Dav and Dav' being varied depending on the dav of the thin layer attached thereto. In a porous membrane for ultrafiltration and gas separation, it is desirable that an average pore size (dav) of the thin layer is determined to be less than 0.1 micron. In the case that a support for the membrane is in the form of a monolayer structure, it is desirable that an average pore size (Dav) of the support is determined to be from 0.05 to 3 micron. In the case that a support for the membrane is in the form of a multilayer structure, it is desirable that an average pore size (Dav) of a basic support corresponding with the monolayer structure is determined to be from 0.1 to 30 micron and that an average pore size (Dav') of an additional support is determined to be less than 1 micron. In a porous membrane for microfiltration, it is desirable that an average pore size (dav) of the thin layer is determined to be from 0.1 to 10 micron. In the case that a support for the membrane is in the form of a monolayer structure, it is desirable that an average pore size (Dav) of the support is determined to be from 0.5 to 30 micron. In the case that a support of the membrane is in the form of a multilayer structure, it is desirable that an average pore size (Dav) of a basic support corresponding with the monolayer structure is determined to be from 3 to 30 micron and that an average pore size (Dav') of an additional support is determined to be from 0.5 to 10 micron. Each minimum value of the average pore sizes (Dav, Dav') is determined in consideration with diffusion resistance of fluid, and each maximum value of them is determined in consideration with a mechanical strength of the support and a formation property of the thin layer. In addition, the thin layer of the multilayer support can be thinner than that of the monolayer support. This is useful to reduce diffusion resistance of fluid.

It is desirable that the porosity of the porous support is determined to be from 25 to 45% by volume. If the porosity is less than 25% by volume, there will occur a problem in adherence of the thin layer. If the porosity is more than 45% by volume, there will occur a problem in the mechanical strength of the support. It is also desirable in strength that the thickness of the thin layer is determined to be from 0.5 to 2 mm, and it is desirable in diffusion resistance that the thickness of the intermediate layer in the multilayer structure is determined to be from 10 to 150 micron.

As described above, the respective maximum pore sizes (Dmax, Dmax') of the monolayer support and the multilayer support should be determined to be from 1 to 250 times the average pore size of the thin layer. This is very important to prevent the forming of pin holes and cracks in the porous membrane. In the multilayer support, the maximum pore size (Dmax) of the basic support should be determined larger than or equal to that (Dmax') of the additional support. As will be described later, the maximum pore size (Dmax, Damx') can be measured by a well-known babble point method. A preferable ratio between the maximum pore size (Dmax, Dmax') and the average pore size (dav) of the thin layer is determined in accordance with the average pore size (dav). In the case that the average pore size (dav) of the thin layer is less than 0.1 micron, the average pore size ratio (Dmax/dav, D'max/dav) should be determined to be from 1 to 100. In the case that the average pore size (dav) is from 0.1 to 10 micron, the average pore size ratio (Dmax/dav, D'max/dav) should be determined to be from 1 to 25. Such determination of the average pore size ratio is effective in eliminating the occurrence of pin holes and cracks in the thin layer and minimizing the thickness of the porous memebrane thereby to remarkably improve the precision and efficiency in filtration and separation.

In a process of forming a porous thin layer the average pore size (dav) of which is less than 0.1 micron, the porous support is coated with colloidal liquid containing fine particles with a particle size of less than 0.4 micron by means of a wet method or a dry method such as a vapor phase method, a pressure forming method or the like. In a process of coating a porous support by immersion in the colloidal liquid, the colloidal liquid is sucked into pores of the support to cause a concentration of the liquid. Thus, a slight change of the water concentration causes sol particles in the colloidal liquid to gel and uniformly adhere onto the surface of the support. In a process of forming a porous thin layer by a dry method, fine particles easily adheres onto the surface of the support and coagulates in place because fine particles are so active. In the case that the average pore size (dav) of the thin layer is determined to be from 0.1 to 10 micron, fine particles having a relatively large diameter of more than 0.4 micron and thus a small surface energy can be used to form the thin layer. Accordingly, it is required that the size of the fine particles is approximately equal to a maximum pore size of the support to prevent the fine particles from entering the support.

In the inorganic porous membrane of the present invention, it is desirable to define each relationship between the maximum pore sizes (Dmax, Dmax') of the support and the thickness of the thin layer (t) and between the average pore sizes (Dav, Dav') of the support and the average pore size (dav) of the thin layer. A minimum ratio (t/Dmax, t/Dmax') between the maximum pore size of the support and the thickness of the thin layer is effective to prevent the occurrence of pin holes, and a maximum ratio between them is effective to prevent the forming of cracks. It is, therefore, desirable that the ratio (t/Dmax, t/Dmax') is from 1 to 5. In a process of successively forming a thin layer onto the support, it is preferable to take into consideration a maximum pore size of the thin layer formed as an intermediate layer. A ratio (Dav/dav, Dav'/dav) between the average pore sizes of the support and the thin layer affects to adherence of the thin layer to the support. It is desirable that the average pore size ratio (Dav/dav, Dav'/dav) is from 1 to 200. In the case that the average pore size (dav) of the thin layer is less than 0.1 micron, the average pore size ratio should be determined to be from 1 to 50. In the case that the average pore size (dav) of the thin layer is from 0.1 to 10 micron, the average pore size ratio should be determined to be from 1 to 10. In addition, it is preferable that inorganic particles superior in heat resistance and corrosion resistance and having a specific surface area of from several $m^2/g$ to several 100 $m^2/g$ are used as a material for the porous thin layer. In the porous membrane for gas separation, $\gamma$-alumina may be used as a material for the thin layer. In the porous membrane for other use where corrosion resistance is required, $\alpha$-alumina, titania, zirconia or the like is suitable as a material for the thin layer. The thin layer is formed onto the porous support and then stabilized by heat treatment such as firing.

In the heat resistant inorganic porous membrane described above, the mixed amount of the components A to E being apt to be corroded by acid, alkali or the like is deteremined less than a predetermined amount to enhance the corrosion resistance and to prevent dissolution of the membrane components. Accordingly, the porous membrane is suitable for use in a field where a big problem is caused by corrosion of the membrane and dissolution of the membrane components. The porous membrane can be provided in the form of a pipe, a flat plate or a honeycomb structure having an average pore size of more than 0.1 micron and being formed thereon with a porous thin layer having an average pore size of less than 0.1 micron. In this case, it is desirable that the average pore size of the porous support is less than 30 micron, particularly less than 3 micron to facilitate formation of the thin layer and to ensure a mechanism strength of the porous membrane. It is also desirable that a material for the support is approximately the same as that of the thin layer, for example, other components of the thin layer such as titanium, zirconium, hafnium, niobium, tantalum oxide, carbide or nitride. A cation radius of these compounds is from 0.6 to 0.9 angstrom and acts neutral to acid and alkali. In addition, it is desirable that a specific surface area of these compounds is less than 10$m^2$/g to be chemically stable. Although the cation radius is out of the range from 0.6 to 0.9 angstrom, a compound such as aluminium of 3 valence and with a cation radius of 0.57 angstrom and silicon of 4 valence and with a cation radius of 0.39 angstrom is useful to improve the corrosion resistance when it has a specific surface area of less than 5 $m^2/g$. Such a compound is selected from $\alpha$-alumina, silicon carbide and the like.

The components A to D described above are apt to be corroded by acid, and the component E is apt to be corroded by acid if it has a cation radius of more than 0.9 angstrom and apt to be corroded by alkali if it has a cation radius of less than 0.6 angstrom. If the component E has a specific surface area of more than 10$m^2$/g, it will noticeably react to acid and alkali. Particularly, the component A is noticeably corroded by acid. For this reason, the mixing amount of the component A should be limited less than 0.1% by weight, preferably less than 0.05% by weight. In the case that the component E is sintered by firing to have a specific surface area of less than 10$m^2$/g, preferably less than 5$m^2$/g, the component E of more than 0.5% by weight may be mixed. In a field where the corrosion resistance of the porous membrane is greatly required, it is desirable that a compound of elements such as aluminium, silicon and the like having a cation radius of less than 0.6 angstrom in the component E is slightly mixed in a range of less than 0.5% by weight. In a field where the resistance to alkali is required, it is also desirable that a compound of elements having a cation radius of more than 0.9 angstrom in the components A to D is slightly mixed in a range of less than 0.5% by weight.

Taking into consideration the sintering conditions of the inorganic porous membrane, a sintering agent and a sintering restrainer should be added in a slight amount to the raw material to facilitate control of the sintering conditions and to ensure a desired mechanical strength of the porour membrane. In this instance, titania (pore size 0.05 micron, purity more than 99.5%) and fine particles of yttria are used as the sintering agent, and fine particles of magnesia are used as the sintering restrainer. As the components A to E are apt to be contained in the sintering agent, sintering restrainer and various binders added to the raw material, a careful attention is needed to restrain the components A to E less than 0.5% by weight after sintering.

In a process of sintering the membrane material, it is desirable that the support of the multilayer membrane is fired at temperatures above 700° C. to have a specific surface area of less than 10$m^2$/g, preferably less than 5$m^2$/g and the porous thin layer is fired at temperatures of from 400° to 700° C. The firing atmosphere may be selectively maintained in oxidation or reduction. When the firing is carried out at temperatures above 1500° C. in an reduction atmosphere, the components A to E disperse to cause reduction of its amount in the fired support. In the case that a raw material of high purity containing the components of less than 0.1% by weight is added with a compound of yttrium and magnesium (less than 0.5% by weight in terms of oxide) and fired in a reduction atmosphere, the components A to E reduces less than 0.5% by weight. In the case that a raw material is added with $\gamma$-alumina of from 1 to 25% by weight (for instance, purity 99.99%, pore size less than 0.1 micron, specific surface area 120$m^2$/g) and fired at temperatures above 1200° C., a porous support superior in mechanical strength and corrosion resistance is obtainable.

In a process of forming a porous thin layer with an average pore size of less than 0.1 micron and composed of the same components as those of the porous support, a suspension of raw material of particle size less than 0.2 micron is coated on the surface of the support and fired at temperatures above 400° C. In this instance, oxides or hydroxides of titanium and zirconium are used as the raw material. To obtain a thin layer having an average pore size of several 10 angstrom, the firing temperature is, in general, maintained below 700° C. to reduce the components A to E in amount less than 0.1% by weight.

To provide a corrosion resistant inorganic porous membrane, the monolayer porous support or the intermediate layer of the multilayer porous support should be formed to have an average pore size of less than 0.1 micron. Formed on the porous support is a uniform porous thin layer having an average pore size of less than 800 angstrom and a thickness of less than 2 micron. In this instance, a maximum pore size of the porous support should be defined in a range of from 1 to 100 times the average pore size of the thin layer. Preferably, the maximum pore size of the porous support should be defined to be less than 0.1 micron. In use of the multilayer porous support, the thin layer is formed on the intermediate layer of the support to reduce diffusion resistance of fluid. In this case, the basic layer of the support is formed to have an average pore size of from 0.5 to 30 micron. The average pore size and thickness of the basic layer is determined in consideration with diffusion resistance of fluid and mechanical strength.

To enhance the corrosion resistance of the porous membrane and eliminate dissolution of the components from the membrane, it is important that as described above the components A to E are determined to be less than 0.5% by weight in terms of oxide. In the case that α-alumina and titania of high purity are used as a main raw material for the membrane, inorganic binders, organic binders and interfatial active agents are added to determine the total weight of the components A to E less than 0.5% by weight.

To enhance the corrosion resistance of the porous thin layer and eliminate dissolution of the components from the thin layer, a hydrosol containing titanium hydroxide or titanium oxide is prepared. The hydrosol can be prepared by hydrolysis of a precursor forming titanium hydroxide or titanium oxide under the presence of acid. The precursor can be selected from an organic titanate compound of alkoxide, acilate, chelate and the like, titanium salt of titanium tetrachloride, titanyl sulfate and the like, and metal and ortho titanoxide or titania. Particularly, the organic titanate compound is suitable for the precursor because of purity and handling thereof. The acid is selected from nitric acid, hydrochloric acid, acetic acid, lower fatty acid and the like, and the addition amount of the acid is determined to be from 0.01 to 0.5 mol/l. Preferably, nitric acid or hydrochloric acid is used as the acid, the addition amount of the acid is determined to be from 0.05 to 0.15 mol/l, and PH of the hydrosol is determined to be from 0.5 to 2. If the addition amount of the acid is out of the proper range, particles of the sol will colugate and precipitate. Or the particles of the sol becomes too fine. In this instance, a first important point is that a molar ratio of the precursor to water is adjusted to be more than 1/200, preferably from 1/200 to 1/40. With such an adjustment, the precursor is properly hydrolyzed under the presence of the acid. If the molar ratio is more than 1/40, the sol will apt to become gel. A second important point is to control conditions of the hydrolysis. For this purpose, the precursor is first entered into hot water of temperatures of above 50° C. for ageing for at least ten minutes. Thereafter, the acid is added to the precursor at temperatures above 70° C. for ageing for at least thirty minutes. During such a process, white suspension of the precursor is prepared when entered into the hot water and, it becomes finally a hydrosol of transpicuous cream color. The particles of the hydrosol have a particle size of from 30 to 1000 angstrom which can be adjusted by the temperature and time of hydrolysis. Finally, the hydrosol is diluted with water to obtain a hydrosol suitable for coating.

The concentration of the coating hydrosol should be adjusted in a molar ratio of less than 1/500. If the molar ratio of the coating hydrosol is adjusted more than 1/500, pin holes and cracks will occur in the process of forming the porous thin layer. A preferable range of the molar ratio is from 1/800 to 1/2000, wherein a uniform thin layer of thickness less than 2 micron is obtained by one or two coating processes. When the molar ratio is lower than the above-described range, the thickness of a layer formed by one coating process is so thin that the coating process should be repeated several times to obtain a uniform thin layer of a desired thickness. In the case that titanium salt is used as the precursor, the titanium salt is first neutralized to remove salt of impurity and is subsequently hydrolyzed under the presence of acid to obtain a hydrosol which is diluted with water to prepare a hydrosol for coating. In the case that particles of titania are used as the precursor, an anatase having a specific surface area of more than $50m^2/g$ is used to facilitate hydrolysis for obtaining a hydrosol.

The hydrosol is coated onto at least one surface of the porous support and fired after drying to form a porous thin layer on the support. The drying is carried out in air at about 100° C. for at least two hours, and the firing is carried out at temperatures of from 300° to 700° C. Thus, a porous thin layer having an average pore size of less than 800 angstrom and superior in corrosion resistance is obtained without causing any pin holes and cracks therein. If the firing temperature was below 300° C., desired corrosion resistance would not be obtained due to insufficient adherence of the thin layer onto the support surface. If the firing temperature exceeded 700° C., an average pore size of the thin layer would become more than 800 angstrom.

DESCRIPTION OF THE PREFERRED EMBODIMENTS

Hereinafter, practical embodiments of the present invention will be described in detail with reference to Tables 1 to 7 attached thereto.

EXAMPLE 1

(1) Preparation of porous supports

Electrofused alumina of various particle sizes was added with inorganic binder and organic binder to prepare a kneading body. The kneading body was extruded by an extrusion molding to form a pipe body having an outer diameter of 10mm, an inner diameter of 7mm and a length of 150mm. After dried, the pipe body was fired at 1500° C. for three hours to obtain a plurality of monolayer porous supports having various average pore sizes caused by the different particle sizes of alumina. A part of the monolayer porous supports was coated at its internal surface with a slurry containing fine particles of α-alumina. After dried, the coated porous support was fired at temperatures of from 1000° to 1300° C. for three hours to obtain a multilayer porous support. Thus, an additional support layer was newly formed on the basic support to have a thickness of 30 micron. An average pore size (Dav') of the addition support layer was adjusted by the grain size of the fine particles and the firing temperature. The respective characteristics of the monolayer and multilayer porous supports are listed on Table 1 attached hereto. The maximum pore sizes Dmax, Dmax' listed on Table 1 were measured by a babble point method, and the average pore sizes Dav, Dav' were measured by a mercury porosimeter. In addition, the purity of alumina was more than 99.6% by weight.

(2) Measurement of maximum pore sizes (by Babble point method)

The porous supports each in the form of a pipe were immersed in a measuring liquid for one hour. Thereafter, the porous support were placed under a reduced pressure of less than 50torr to remove air babbles therefrom. The treated supports each were closed at their opposite ends and placed in a liquid vessel for measurement. Subsequently, the supports each were applied therein with compressed air to read out an air pressure P at a time when babbles started to discharge from the support. Thus, the maximum pore sizes D each were calculated by the following formula on a basis of the measured air pressure.

$$D = \frac{4\gamma\cos\theta}{P - hS} \approx \frac{4\gamma}{P}$$

D: Maximum pore size (micron)
P: Air pressure (kg/m$^2$)
$\gamma$: Surface tension (kg/m)
h: Depth of liquid (m)
S: Density of liquid (kg/m$^3$)
0: Contact angle of liquid (deg)

In addition, the above formula is simplified because of $\theta=0$, $P>>hS$. For measurement of a support the maximum pore size of which is more than 0.42 micron, water was used as the liquid. For measurement of a support the maximum pore size of which is less than 0.42 micron, trifluorochloroethylene was used as the liquid.

(3) Preparation of porous thin layers

No. 1

Commercially available alumina sol (Nissan Kagaku K.K., Trade name: Aluminasol-200) was diluted with water in such a manner that Al$_2$O$_3$ of 5% by weight is contained. Thus, a selected porous support was coated at its internal surface with the diluted alumina sol. Thereafter, the coated porous support was dried at a room temperature for one hour and subsequently at 60° C. for one hour. The dried porous support was heated up to 380° C. at a speed of 100° C./hr and retained in place for three hours. As a result, a porous thin layer having an average pore size of 40 angstrom was formed on the support.

No. 2

An ethanol solution containing titaniumisopropoxide as a part of TiO$_2$ 5% by weight was added with water five times a molar ratio of TiO$_2$ and stirred for two hours. Thus, a selected porous support was coated at its internal surface with the solution. After dried, the porous support was treated in the same manner as that of No. 1. As a result, a porous thin layer having an average pore size of 50 angstrom was formed on the support.

No. 3

A solution containing fine particles of titania with an average particle size of 0.1 micron 3% by weight was added with a surface active agent and an organic peptizer and stirred for sixteen hours to prepare a coating liquid. Thus, a selected porous support was coated at its internal surface with the solution. After dried, the porous support was fired at 1000° C. and treated in the same manner as that of No. 1. As a result, a porous thin layer having an average pore size of 500 angstrom was formed on the support.

No. 4

A solution containing fine particles of $\alpha$-alumina with an average pore size of 0.5 micron 3% by weight was added with a surface active agent and an organic peptizer and stirred for sixteen hours to prepare a coating liquid. Thus, a selected porous support was coated at its internal surface with the solution. After dried, the porous support was fired at 1000° C. and treated in the same manner as that of No. 1. As a result, a porous thin layer having an average pore size of 2000 angstrom was formed on the support.

No. 5

A solution containing fine particles of $\alpha$-alumina with an average particle size of 3 micron 3% by weight was added with a surface active agent and an organic peptizer and stirred for sixteen hours to prepare a coating liquid. Thus, a selected porous support was coated at its internal surface with the solution. After dried, the porous support was fired at 1300° C. and treated in the same manner as that of No. 1. As a result, a porous thin layer having an average pore size of 1 micron was formed on the support.

In addition, the purity of the thin layers was more than 99.8% by weight in terms of oxide, and the average pore sizes were measured by a mercury porosimeter.

(4) Measurement of membrane characteristics of the porous thin layers

With respect to the multilayer porous membranes prepared as described above, the following tests were made to obtain test results shown in Table 2.

Pure water flux:

Distilled water under pressure of from 0.5 to 5kg/cm$^2$ was introduced into the porous membrane from its one end toward its other end to calculate pure water flux per a unit membrane area, a unit time and a unit pressure.

Crossflow filtration:

A solution containing a marker of 100ppm was circulated through a bore of the porous membrane at a speed of 2.5m/sec and at an inlet pressure of 3kg/cm$^2$ to analyze permeate flux of the membrane thereby to calculate a rejection efficiency of the marker. As the marker, bovin serum albumin (mean molecular weight 65,000), $\gamma$-globulin (mean molecular weight 156,000), blue dextran (mean molecular weight 2,000,000), uniform latex (particle diameter 1.1 micron), and the like were selectively used in accordance with the average pore sizes of the porous thin layers.

Corrosion resistance:

The porous membranes were immersed in a solution of HCl (PH=0) at 90° C. and a solution of NaOH (PH=14) for 168 hours to observe the presence of pin holes and cracks in the thin layers by means of an electron microscope of the scanning type.

In Table 2:

* 1, * 2, and * 3 indicate values of Dmax' and Dav' in the porous membranes each having the multilayer support (No. 3–No. 6).

* 4 indicates the presence of pin holes and cracks before and after the test of corrosion resistance.

* 5 indicates the case where albumin was used as the marker.

* 6 indicates the case where $\gamma$-globulin was used as the marker.

* 7 indicates the case where blue dextran was used as the marker.

* 8 indicates the case where uniform latex was used as the marker.

In Table 2, although porous membranes Nos. 1 to 4 each had a thin layer with the same average pore size (dav) of 40 angstrom, the porous membranes Nos. 1 and 2 had a higher rejection efficiency of more than 99% against bovine serum albumin than the porous membranes Nos. 3 and 4 due to the difference in the maximum pore sizes (Dmax). The porous membrane No. 1 with a thinner thin layer had larger values of the pure water flux and the permeate flux than the porous membrane No. 2 with a thicker thin layer to be more effective in filtration and separation. Although the porous membranes Nos. 1 and 2 with thin layers of $\gamma$-alumina have low resistance against alkali corrosion, they are useful, for example, for gas separation.

Porous membranes Nos. 5 to 8 with a thin layer of 50 angstrom, which were capable of almost perfectly rejecting albumin, could be prepared without any pin holes and cracks by controlling the values of Dmax/dav, Dmax'/dav within appropriate ranges. Especially, the porous membranes Nos. 7 and 8 of the multilayer porous supports with an average pore size Dav' of the additional support of less than 0.1 micron and a thickness of the thin layer of less than 1 micron had a high value of permeate flux. On the other hand, in a porous membrane No. 9, cracks increased to cause partial peeling off in the thin layer thereby to decrease the rejection efficiency against albumin to 2%.

Porous membranes Nos. 10 to 14 with a thin layer of more than 50 angstrom, which were capable of almost perfectly rejecting each marker, could be prepared without any pin holes and cracks by controlling the values of Dmax/dav, Dmax'/dav within appropirate ranges. These porous membranes showed no change in their efficiency after the corrosion test.

EXAMPLE 2

(1) Preparation of porous supports

Main material, I . . . commercially available single crystal alumina (purity—$Al_2O_3$ more than 99.9%, A–E components 0.05wt %), II . . . electrofused alumina (purity—$Al_2O_3$ more than 99.7%, A–E components 0.3wt %), III . . . Silicon carbide powder (purity—SiC 99.8%, A–E component 0.2wt %), or IV . . . rutile type titania powder (purity—$TiO_2$ 99.9%, A–E components 0.08wt %), each was added and mixed with yttrium or magnesium in the form of nitrates, $\gamma$-alumina (specific surface area of 120$m^2$/g, particle diameter of less than 0.1 micron, and purity of 99.99%), titania fine powder (particle diameter of less than 0.05 micron, and purity of 99.5%), if necessary, to adjust the mixed ratio of A–E components. The mixed ratio (wt %) was calculated in terms of oxide of each compound. The mixed material was extruded to form a pipe body having an outer diameter of 10mm, an inner diameter of 7mm and a length of 150mm. A porous support was produced by firing the pipe body. A series of test porous supports thus produced each had an average pore size of 1 micron and a maximum pore size of 1.2 micron, the respective characteristics of which porous supports are listed on Table 3 attached hereto. In Table 3, the mechanical strength is the result of fructure test by applying internal pressure to a porous support and shown by X when the fracture pressure was less than 50kg/$cm^2$, by O when between 50kg/$cm^2$ –100kg/$cm^2$, and by ⊙ when more than 100kg/$cm^2$. The weight loss was measured by a decrease in weight of the porous support after corrosion resistance test made by submersion in a solution of HCl (PH=0) and a solution of NaOH (PH=14) each at 90° C. and for 168 hours. The strength deterioration was measured by a decrease in the mechanical strength of the porous support after the corrosion resistance test and shown by ⊙ when there was no change before and after the test, by O when a decrease of less than 10%, and by X when a decrease of more than 10%.

As is clearly seen from Table 3, porous supports Nos. 8, 9 and 16 with A–E components of more than 0.5 wt % are large in the weight loss and the strength deterioration, while the rest of the porous supports with A–E components of less than 0.5 wt % are small in the weight loss and the strength deterioration. The porous supports Nos. 1, 10 and 13 without additives are superior in corrosion resistance but inferior in mechanical strength to the porous suports Nos. 2–7, 11, 12, 14 and 15 with additives. Therefore, addition af A–E components of less than 0.5 wt %, $\gamma$-alumina, or titania fine power is preferable to increase the mechanical strength of the porous suport. Expecially, addition of titania is more effective than $\gamma$-alumina for this purpose. Since the specific surface area of $\gamma$-alumina cannot be less than 10$m^2$/g at the firing temperature of 650° C., addition of $\gamma$-alumina results in an increase of A–E components. For this reason, in the case of $\gamma$-alumina addition, the preferable firing temperature may be, for example, 1500° C. to attain the specific surface area of $\gamma$-alumina of less than 10$m^2$/g. The result of porous supports Nos. 4 and 5 shows that corrosion resistance of porous suppots is increased by firing under the reduction atmosphere. As for main material, titania is most preferable, and $\alpha$-alumina and silicon carbide follow in this order.

(2) Preparation of porous thin layers

To prepare porous membranes, the porous supports Nos 14, 15 and 16 in Table 3 were coated with porous thin layers of titania or $\gamma$-alumina containg A–E components and having an average pore size of 50 angstrom. The thickness of the porous thin layer was 2.0 micron and the value Dmax/dav was 240.

To form titania porous thin layers, titanium tetrachloride was first hydrolyzed to produce titanic acid and then peptized to make coating sol. The coating sol, added with yttrium or magnesium in the form of nitrates, if necessary, was coated onto the surface of the porous support. The coated porous support was dried and then fired at 400 C. As a result, a porous thin layer having an average pore size of 50 angstrom was formed on the support. To form $\gamma$-alumina porous thin layers, commercially available boehmite sol ($\gamma$-alumina 99.8%, specific surface area 150$m^2$/g) was coated onto the surface of the porous support. The coated porous support was dried and then fired at 600° C. As a result, a porous thin layer having an average pore size of 50 angstrom was formed on the support.

A buffer solution containing bovine serum albumin (average molecular weight 65,000) of 100 ppm was circulated through a bore of the porous membrane adapted for crossflow filtration at a speed of 2.5m/sec and at an inlet pressure of 3kg/$cm^2$ to analyze a permeate flux of the membrane thereby to calculate a rejection efficiency of the albumin and to measure amount of ion solved from the membrane (A–E components). The results obtained by this test are listed on Table 4 attached hereto. Corrosion test in Table 4 was carried out under the same conditions as those for the porous supports described before. As for amount of ion solved, ND means below a detectable limit (1mg/l). Pin holes and cracks were not found in the porous thin layer of any of the porous membranes.

As is clearly seen from Table 4, porous membranes Nos. 1 to 4 have the same values of rejection efficiency against albumin before and after the corrosion resistance test, and iron solved from the membranes was not substantially detected in any of the porous membranes after the corrosion test. To adapt for ultrafiltration, the efficiency of removing endotoxin of the porous membranes Nos. 1 to 4 was tested to be negative by limulus test. This means that these membranes are very effective in use for refining pyrogen free medical supplies.

Porous membrane No. 5 is high in corrosion resistance of the porous support, but low in rejection efficiency and high in amount of ion solved after the corrosion test, because the content of A-E components in the thin layer is more than 0.5 wt %. Porous membrane No. 6 is very low in rejection efficiency and very high in amount of ion solved after the corrosion test, because the thin layer is formed of $\gamma$-alumina. Porous membrane No. 7 is low in rejection efficiency and very high in amount of ion solved after the corrosion test, because the porous support is low in corrosion resistance to cause partial breakage of the structure of the thin layer.

EXAMPLE 3

(1) Preparation of Porous Supports

Two kinds of porous supports I and II were provided in the form of a multilayer structure having a tubular basic support and a thin additional support. To prepare the basic support, a kneading body was extruded to form a pipe body having an outer diameter of 10mm, an inner diameter of 7mm and a length of 150mm. After dried, the pipe body was fired at 1500° C. for three hours to obtain a monolayer porous support. The monolayer porous support was coated at its external surface with a slurry. After dried, the coated porous support was fired at 1300° C. to obtain a mutilayer porous support. Thus, an additional support layer was newly formed on the basic support to have a thickness of 30 micron. The basic support was made of $\alpha$-alumina of 99.92% purity, while the additional support was made of $\alpha$-alumina of more than 99.99% purity.

Porous support I: an average pore size of the basic support being 3 micron, an average pore size of the additional support being 800 angstrom, and a maximum pore size Dmax' of the same being 0.4 micron.

Porous support II: an average pore size of the basic support being 3 micron, and an average pore size of the additional support being 0.2 micron, and a maximum pore size Dmax' of the same being 1.5 micron.

(2) Preparation of hydrosol before dilution

Titanium isopropoxide or titanium tetrachloride as the precursor was hydrolyzed at 80° C. for two hours under the presence of hydrochloric acid (added 0.1 mol/l) to obtain a hydrosol before dilution as listed on Table 5 attached hereto. In the case that titanium tetrachloride was used as the precursor, the titanium tetrachloride was first hydrolyzed with ammonia water to obtain white precipitate. The white precipitate was washed with water until chlorine ion was not detected, and then hydrolyzed as described above.

(3) Preparation of coating sol

The hydrosol prepared as described above was diluted to obtain a hydrosol for coating as listed on Table 6 attached hereto.

(4) Preparation of porous membranes

The multilayer porous support was coated at its external surface with the coating sol. After dried at room temperature for two hours and then at 100° C. for two hours, the coated porous support was fired at various temperatures for three hours to form a porous thin layer. The average pore size of the thin layer was adjusted by the firing temperature.

(5) Measurement of membrane characteristics of the porous membranes

With respect to the multilayer porous membrane prepared as described above, the following tests were made to obtain test results shown in Table 7.

Crossflow filtration:

The test procedure of crossflow filtration was the same as described before. As the marker, bovine serum albumin (average molecular weight of 65000) was used for the thin layer with an average pore size of 35 or 50 angstrom, while uniform latex (particle diameter of 0.8 micron) for the thin layer with an average pore size of 680 or 850 angstrom.

Corrosion resistance:

The test procedure of corrosion resistance was the same as described before. Rejection efficiency was measured before and after the corrosion test.

Peel-off of thin layers:

Porous membranes after corrosion resistance test was set in an ultrasonic washer to observe peel-off of the porous membranes by ultrasonic waves.

Pin holes and cracks:

Pin holes and cracks were observed before and after the corrosion resistance test in the same manner as described before.

(6) Consideration

As is clearly seen from Table 7, a porous membrane No. 9 with a thin layer having an average pore size of more than 800 angstrom, Nos. 3 and 12 with a thin layer having a thickness of more than 2 micron, and No. 14 with a thin layer coated onto a porous support having an average pore size of more than 0.1 micron, all these membranes have lower values of membrane characteristics than desired. Other porous membranes have high values of membrane characteristics as desired except No. 7 which was fired at a very low temperature. In other words, to minimize the thickness of porous membranes with a thin layer having an average pore size dav of less than 0.1 micron, it is necessary that Dmax'/dav is determined within a range of from 1 to 100 and t/Dmax' is determined within a range of from 1 to 5. This is imporant especially in the case of oxides such as $TiO_2$ which is less flexible and more apt to sinter than $\gamma$-$Al_2O_3$. It was also confirmed that ion permeated from the thin layer was not detected when porous membranes had high values of other membrane characteristics as desired.

In preparation of porous membranes, porous membranes with desired membrane characteristics could not be obtained when the molar ratio of precursor to water in hydrosol is less than 1/200 (No. 12) or the molar ratio after dilution is more than 1/500 (No. 13). On the contrary, porous membranes with all the desired membrane characteristics could be obtained when the molar ratio in hydrosol is more than 1/200 and the molar ratio after dilution is less than 1/500 except No. 7. A more preferable range of the molar ratio is from 1/200 to 1/40 in hydrosol and from 1/800 to 1/2000 after dilution. When the molar ratio in hydrosol is 1/30 (No. 1), hydrosol should be handled with care due to rapid gelation thereof. When the molar ratio after dilution is 1/3000 (No. 11), coating should be repeated several times. Appropriate temperature for firing thin layers is within a range of from 300° to 700° C. At a lower firing temperature (No. 7), the porous membrane is low in corrosion resistance, while the membrane is low in rejection efficiency at a higher firing temperature (No. 9).

Although the preferred embodiments of the present invention have been disclosed, it will be apparent to those skilled in the art that various changes and modifications may be made thereto without departing from the scope thereof as defined in the appended claims.

TABLE 1

| Support No. | Structure | Dmax (μm) | Dav (μm) | D' max (μm) | D' av (μm) |
|---|---|---|---|---|---|
| 1 | Mono Layer | 0.87 | 0.78 | — | — |
| 2 | " | 1.20 | 0.78 | — | — |
| 3 | Multi Layer | 3.0 | 2.5 | 0.42 | 0.30 |
| 4 | " | 3.0 | 2.5 | 0.25 | 0.08 |
| 5 | " | 30 | 20 | 2.5 | 0.08 |
| 6 | " | 2.0 | 1.0 | 0.09 | 0.05 |
| 7 | Mono Layer | 5.0 | 3.0 | — | — |
| 8 | " | 15 | 20 | — | — |

TABLE 2

| Porous Membrane No. | Support No. | Dmax *1 μm | Dav *2 μm | Thin Layer No | dav(Å) | Thickness (μm) | Dmax/dav *3 | Pin Hole Crack *4 | Pure Water Flux [l/m²·hr·(Kg/cm²)] | Crossflow Filtration Rejection Efficiency | Permeate Flux (l/m²·hr) |
|---|---|---|---|---|---|---|---|---|---|---|---|
| 1 | 1 | 0.87 | 0.78 | 1 | 40 | 2.7 | 218 | No | 10 | 100% *5 | 5 |
| 2 | 1 | " | " | 1 | 40 | 7.0 | 218 | " | 4 | 99 | 2 |
| 3 | 2 | 1.20 | " | 1 | 40 | 2.5 | 300 | Addition | 25 | 78 | 18 |
| 4 | 2 | " | " | 1 | 40 | 7.0 | 300 | " | 10 | 86 | 6 |
| 5 | 3 | 0.42 | 0.30 | 2 | 50 | 2.0 | 84 | No | 150 | 100 *5 | 80 |
| 6 | 4 | 0.25 | 0.08 | 2 | 50 | 2.0 | 50 | " | 140 | 100 | 70 |
| 7 | 4 | " | " | 2 | 50 | 1.0 | 50 | " | 220 | 100 | 110 |
| 8 | 6 | 0.09 | 0.05 | 2 | 50 | 0.3 | 18 | " | 280 | 100 | 130 |
| 9 | 5 | 2.5 | 0.08 | 2 | 50 | 5.0 | 500 | Addition | 550 | 15 | 350 |
| 10 | 3 | 0.42 | 0.30 | 3 | 500 | 10 | 8.4 | No | 350 | 100 *6 | 280 |
| 11 | 4 | 0.25 | 0.08 | 3 | 500 | 3.0 | 5.0 | " | 600 | 100 | 550 |
| 12 | 4 | " | " | 3 | 500 | 1.0 | 5.0 | " | 750 | 100 | 680 |
| 13 | 7 | 5.0 | 3.0 | 4 | 0.2 μm | 20 | 25 | " | 1500 | 100 *7 | 1350 |
| 14 | 8 | 15 | 20 | 5 | 1.0 μm | 50 | 15 | " | 3500 | 100 *8 | 3200 |

TABLE 3

| Support No. | Main Material | A~E Component wt % | Additive A~E Component | Additive γ-Alumina | Additive TiO₂ | Firing Conditions Temperature °C. | Firing Conditions Atmosphere | Mechanical Strength of Substrate | Weight Loss (%) PH = 0 | Weight Loss (%) PH = 14 | Strength Deterioration |
|---|---|---|---|---|---|---|---|---|---|---|---|
| 1 | I | 0.05 | No | No | No | 1500 | Oxidation | X | 0.01 | 0.01 | |
| 2 | " | " | " | Addition | " | " | " | | 0.02 | 0.02 | |
| 3 | " | " | " | No | Addition | " | " | | 0.01 | 0.01 | |
| 4 | " | 0.09 | Addition | " | No | " | " | | 0.02 | 0.03 | |
| 5 | " | 0.07 | " | " | " | " | H₂ Reduction | | 0.00 | 0.00 | |
| 6 | " | 0.20 | " | " | " | " | Oxidation | | 0.03 | 0.03 | |
| 7 | " | 0.40 | " | " | " | " | " | | 0.08 | 0.07 | |
| 8 | " | 0.65 | " | " | " | " | " | | 0.43 | 0.28 | X |
| 9 | " | 4.50 | " | Addition | " | 650 | " | | 3.8 | 4.3 | X Breakdown |
| 10 | II | 0.30 | No | No | " | 1500 | " | | 0.20 | 0.18 | |
| 11 | " | 0.40 | Addition | " | " | " | " | | 0.03 | 0.02 | |
| 12 | III | 0.40 | " | " | Addition | " | N₂ Stream | | 0.01 | 0.01 | |
| 13 | IV | 0.08 | No | " | No | " | Oxidation | | 0.00 | 0.00 | |
| 14 | " | " | " | " | Addition | " | " | | " | " | |
| 15 | " | 0.40 | Addition | " | No | " | " | | 0.04 | 0.03 | |
| 16 | " | 0.65 | " | " | " | " | " | | 0.35 | 0.48 | X |

TABLE 4

| Porous Membrane | Support No. | A~E Component in the Support | Thin Layer Composition Main Component | Thin Layer Composition A~E | Rejection Efficiency (Fresh) | Rejection Efficiency (After corrosion Test) PH = 0 | Rejection Efficiency (After corrosion Test) PH = 14 | Amount of Ion Solved (After corrosion Test) PH = 0 | Amount of Ion Solved (After corrosion Test) PH = 14 |
|---|---|---|---|---|---|---|---|---|---|
| 1 | 14 | 0.08 wt % | TiO₂ | 0.01 wt % | 100% | 100% | 100% | ND | ND |
| 2 | " | " | " | 0.09 | " | " | " | " | " |
| 3 | " | " | " | 0.40 | " | " | " | " | " |
| 4 | 15 | 0.40 | " | 0.09 | " | " | " | 5 mg/l | " |
| 5 | 14 | 0.08 | " | 0.65 | " | 88 | 94 | 2 | 2 mg/l |
| 6 | " | " | Al₂O₃ | 99.8 | 98 | 5 | 2 | 100 | 185 |
| 7 | 16 | 0.65 | TiO₂ | 0.09 | 100 | 92 | 95 | 65 | 95 |

TABLE 5

| Hydrosol No. | Precursor | Precursor/Water (Molar Ratio) | Condition of Sol After Preparation | Condition of Sol After Some Hours |
| --- | --- | --- | --- | --- |
| 1 | Titanium Isopropoxide | 1/30 | Dispersion Sol Clear Sol | Gelation After 15 Hours |
| 2 | Titanium Isopropoxide | 1/50 | Dispersion Sol Clear Sol | Dispersion Sol After 100 Hours |
| 3 | Titanium Isopropoxide | 1/100 | Dispersion Sol Clear Sol | Dispersion Sol After 100 Hours |
| 4 | Titanium Isopropoxide | 1/300 | Precipitate | Precipitate |
| 5 | Titanium Tetrachloride | 1/100 | Dispersion Sol Clear Sol | Dispersion Sol After 100 Hours |

TABLE 6

| Coating Sol No. | Hydrosol No. | Precursor/Water (Molar Ratio) | Molar Ratio After Dilution | Condition of Coating Sol |
| --- | --- | --- | --- | --- |
| 1 | 1 | 1/30 | 1/800 | Clear Sol |
| 2 | 2 | 1/50 | " | " |
| 3 | 3 | 1/100 | 1/300 | " |
| 4 | " | " | 1/500 | " |
| 5 | " | " | 1/800 | " |
| 6 | " | " | 1/2000 | " |
| 7 | " | " | 1/3000 | " |
| 8 | 4 | 1/300 | 1/800 | Precipitate |
| 9 | 5 | 1/100 | " | Clear Sol |

TABLE 7

| Porous Membrane No. | Hydrosol | Coating Sol | Number of Coating Times | Firing Temp. (°C.) | Thin Layer Average Pore Diameter (Å) | Thin Layer Thickness μm | Rejection Efficiency % | Permeate Flux (L/m²·hr) | Corrosion Test Rejection Efficiency (%) PH = 0 | Corrosion Test Rejection Efficiency (%) PH = 14 | Peel Off | Crack Pin Hole |
| --- | --- | --- | --- | --- | --- | --- | --- | --- | --- | --- | --- | --- |
| 1 | 1 | 1 | 1 | 400 | 50 | 1.2 | 100 | 120 | 100 | 100 | No | No |
| 2 | 2 | 2 | 1 | 400 | 50 | 1.2 | 100 | 110 | 100 | 100 | " | " |
| 3 | 3 | 3 | 1 | 400 | 50 | 3.5 | 98 | 30 | 88 | 85 | A Small Amount | A Small Amount Addition |
| 4 | 3 | 4 | 1 | 400 | 50 | 2.0 | 100 | 80 | 100 | 100 | No | No |
| 5 | 3 | 5 | 1 | 400 | 50 | 1.2 | 100 | 130 | 100 | 100 | " | " |
| 6 | 3 | 5 | 2 | 400 | 50 | 2.0 | 100 | 90 | 100 | 100 | " | " |
| 7 | 3 | 5 | 1 | 200 | 35 | 1.3 | 98 | 60 | 65 | 70 | A Large Amount | " |
| 8 | 3 | 5 | 1 | 700 | 680 | 1.1 | 100 | 200 | 100 | 100 | No | " |
| 9 | 3 | 5 | 1 | 800 | 860 | 1.1 | 85 | 150 | 85 | 85 | " | " |
| 10 | 3 | 6 | 3 | 400 | 50 | 1.8 | 100 | 100 | 100 | 100 | " | " |
| 11 | 3 | 7 | 5 | 400 | 50 | 1.8 | 98 | 140 | 96 | 95 | " | A Small Amount Addition |
| 12 | 4 | 8 | 1 | 400 | 50 | 5.0 | 20 | 350 | 5 | 10 | A Large Amount | A Small Amount Addition |
| 13 | 5 | 9 | 1 | 400 | 50 | 1.5 | 100 | 120 | 100 | 100 | No | No |
| 14 | 3 | 5 | 1 | 400 | 50 | 0.5 | 25 | 800 | 15 | 18 | " | Addition |

What is claimed is:

1. A process for the production of an inorganic porous membrane, comprising the steps of:
   providing a porous support;
   providing a hydrosol containing titanium hydroxide or titanium oxide, wherein a precursor forming the hydrosol is hydrolyzed under the presence of acid at a molar ratio of the precursor to water of more than 1/200 and a molar ratio of titanium compound contained in the hydrosol to water is diluted to less than 1/500;
   coating at least one surface of said porous support by immersion thereof in said hydrosol, so as to form a porous thin layer on said support;
   drying the hydrosol coated porous support; and
   firing the hydrosol coated porous support at a temperature of about 300°–700° C.

2. The process of claim 1, wherein said hydrosol coated porous support is fired at a temperature of about 400°–700° C.

3. The process of claim 1, wherein the molar ratio of the precursor to water is about 1/200–1/40 and the molar ratio of titanium compound contained in the hydrosol to water is diluted to about 1/800–1/2000.

* * * * *